(12) United States Patent
Kao et al.

(10) Patent No.: US 7,724,311 B2
(45) Date of Patent: May 25, 2010

(54) OPTICAL PROJECTING SYSTEM

(75) Inventors: Po-Sung Kao, Tan-Tzu Hsiang (TW); Te-Wei Liu, Tan-Tzu Hsiang (TW)

(73) Assignee: Asia Optical Co., Inc. (TW)

( * ) Notice: Subject to any disclaimer, the term of this patent is extended or adjusted under 35 U.S.C. 154(b) by 1072 days.

(21) Appl. No.: 11/405,542

(22) Filed: Apr. 18, 2006

(65) Prior Publication Data

US 2006/0244922 A1 Nov. 2, 2006

(30) Foreign Application Priority Data

May 2, 2005 (TW) .............................. 94114114 A

(51) Int. Cl.
*H04N 9/12* (2006.01)
*H04N 9/31* (2006.01)

(52) U.S. Cl. ...................... 348/743; 348/744; 348/759; 348/756; 348/760; 348/742; 353/84; 353/31

(58) Field of Classification Search ................ 348/743, 348/742, 744, 759, 760, 771, 756, 675; 353/84, 353/30, 31; 359/891, 627
See application file for complete search history.

(56) References Cited

U.S. PATENT DOCUMENTS

| | | | |
|---|---|---|---|
| 6,597,409 B1 * | 7/2003 | Shioya et al. ............... | 348/743 |
| 6,733,137 B2 * | 5/2004 | Tomiya ....................... | 353/84 |
| 7,165,847 B2 * | 1/2007 | Pettitt .......................... | 353/84 |
| 7,252,391 B2 * | 8/2007 | Dewald et al. ................ | 353/84 |
| 7,414,677 B2 * | 8/2008 | Kim ............................ | 348/743 |

* cited by examiner

*Primary Examiner*—David L Ometz
*Assistant Examiner*—Jean W Désir
(74) *Attorney, Agent, or Firm*—Banner & Witcoff, Ltd.

(57) ABSTRACT

An optical projecting system includes a light-splitting unit for splitting composite source light into a plurality of composite light beam components, and a reflective color wheel rotatable about a rotation axis and including a plurality of multi-layer light-reflecting sections for further splitting each of the composite light beam components into a plurality of colored light beam components for subsequent modulation and projection. Each of the multi-layer light-reflecting sections includes a plurality of light-filtering layers stacked along the rotation axis, and each being capable of reflecting light within a predefined distinct wavelength range, and permitting transmission of light outside the predefined distinct wavelength range therethrough. Sequences of the light-filtering layers of an adjacent pair of the multi-layer light-reflecting sections are different from each other.

20 Claims, 14 Drawing Sheets

OPTICAL PROJECTING SYSTEM

CROSS-REFERENCE TO RELATED APPLICATION

This application claims priority of Taiwanese Application No. 094114114, filed on May 2, 2005.

BACKGROUND OF THE INVENTION

1. Field of the Invention

The invention relates to an optical projecting system, more particularly to an optical projecting system capable of reducing losses in light energy.

2. Description of the Related Art

As shown in FIG. 1, a conventional optical projecting system includes a light source 1, a light tunnel 2, a transmissive color wheel 3, a digital micro-mirror device (DMD) 4, and a screen 5. The light source 1 is capable of providing source light 101. The light tunnel 2 is capable of receiving, guiding, and focusing the source light 101 to result in focused light. The transmissive color wheel 3 is rotatable about a rotation axis (X1), and includes a plurality of spiral light-filtering components 301 that are distributed around the rotation axis (X1). The light-filtering components 301 of the transmissive color wheel 3 include sequentially arranged red, blue and green light-filtering components (r), (b), (g), as best illustrated in FIG. 2. The red, blue and green light-filtering components (r), (b), (g) allow transmission of red, blue and green light therethrough, respectively. The transmissive color wheel 3 rotates at an extremely high speed about the rotation axis (X1) as the focused light exits the light tunnel 2 so as to filter the focused light into red, blue and green focused light components sequentially and cyclically. The red, blue and green focused light components are subsequently projected toward the DMD 4, which then modulates the red, blue and green focused light components into red, blue and green modulated light components, respectively, and projects them onto the screen 5 so that colored images are presented on the screen 5.

Although the conventional optical projecting system is capable of projecting colored images, the following shortcomings exist during use:

1. As shown in FIG. 2, when the focused light passes through the red light-filtering component (r), only the red focused light component thereof is transmitted toward the DMD 4, while the blue and green focused light components are reflected back to the light tunnel 2. Similarly, when the focused light passes through the blue light-filtering component (b), only the blue focused light component thereof is transmitted toward the DMD 4, while the red and green focused light components are reflected back to the light tunnel 2. When the focused light passes through the green light-filtering component (g), only the green focused light component thereof is transmitted toward the DMD 4, while the red and blue focused light components are reflected back to the light tunnel 2. This results in high losses in light energy, i.e., reduction in light utilization, in addition to presenting adverse effects on brightness of projected images.

2. Although a small portion of the focused light components that are reflected back to the light tunnel 2 by the red, blue and green light-filtering components (r), (b), (g) can eventually reach the transmissive color wheel 3, the focused light components that are reflected back to the light tunnel 2 can cause the light tunnel 2 to overheat such that the service life of the light tunnel 2 is shortened and the quality of the conventional optical projecting system is thus adversely affected.

3. As shown in FIG. 1, the light source 1, the light tunnel 2, the transmissive color wheel 3, and the DMD 4 are aligned along the rotation axis (X1). In addition, the light tunnel 2 extends along the rotation axis (X1) and has a definite length. For these reasons, the conventional optical projecting system is bulky and occupies too much space.

As shown in FIG. 3, another transmissive color wheel 6 is used instead of the transmissive color wheel 3 in a modified conventional optical projecting system. The transmissive color wheel 6 includes three fan-shaped light-filtering components 601, which include red, blue, and green light-filtering components (r'), (b'), (g') that allow transmission of red, blue, and green light therethrough, respectively. Therefore, as with the red, blue and green light-filtering components (r), (b), (g) of the transmissive color wheel 3, the red, blue, and green light-filtering components (r'), (b'), (g') of the transmissive color wheel 6 only allow corresponding colors of the focused source light 101 to be transmitted therethrough, with a major portion of the focused source light 101 reflected back to the light tunnel 2 (as shown in FIG. 1).

SUMMARY OF THE INVENTION

Therefore, the object of the present invention is to provide an optical projecting system that can improve light utilization, that enhances brightness of projected images, and that is relatively small in size.

According to the present invention, there is provided an optical projecting system that includes a light source, a light-splitting unit, a reflective color wheel, a light-modulating unit, and a projecting lens. The light source is capable of providing composite source light. The light-splitting unit receives the composite source light provided by the light source, and splits the composite source light into a plurality of composite light beam components. The reflective color wheel is disposed to receive the composite light beam components from the light-splitting unit, is rotatable about a rotation axis, and includes a plurality of multi-layer light-reflecting sections for further splitting each of the composite light beam components into a plurality of colored light beam components. Each of the multi-layer light-reflecting sections includes a plurality of light-filtering layers stacked along the rotation axis. Each of the light-filtering layers of each of the multi-layer light-reflecting sections is capable of reflecting light within a predefined distinct wavelength range, and permits transmission of light outside the predefined distinct wavelength range therethrough. Sequences of the light-filtering layers of an adjacent pair of the multi-layer light-reflecting sections are different from each other. The light-modulating unit is disposed to receive the colored light beam components from the reflective color wheel, and is operable to modulate the colored light beam components. The projecting lens is disposed to receive modulated light beam components from the light-modulating unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
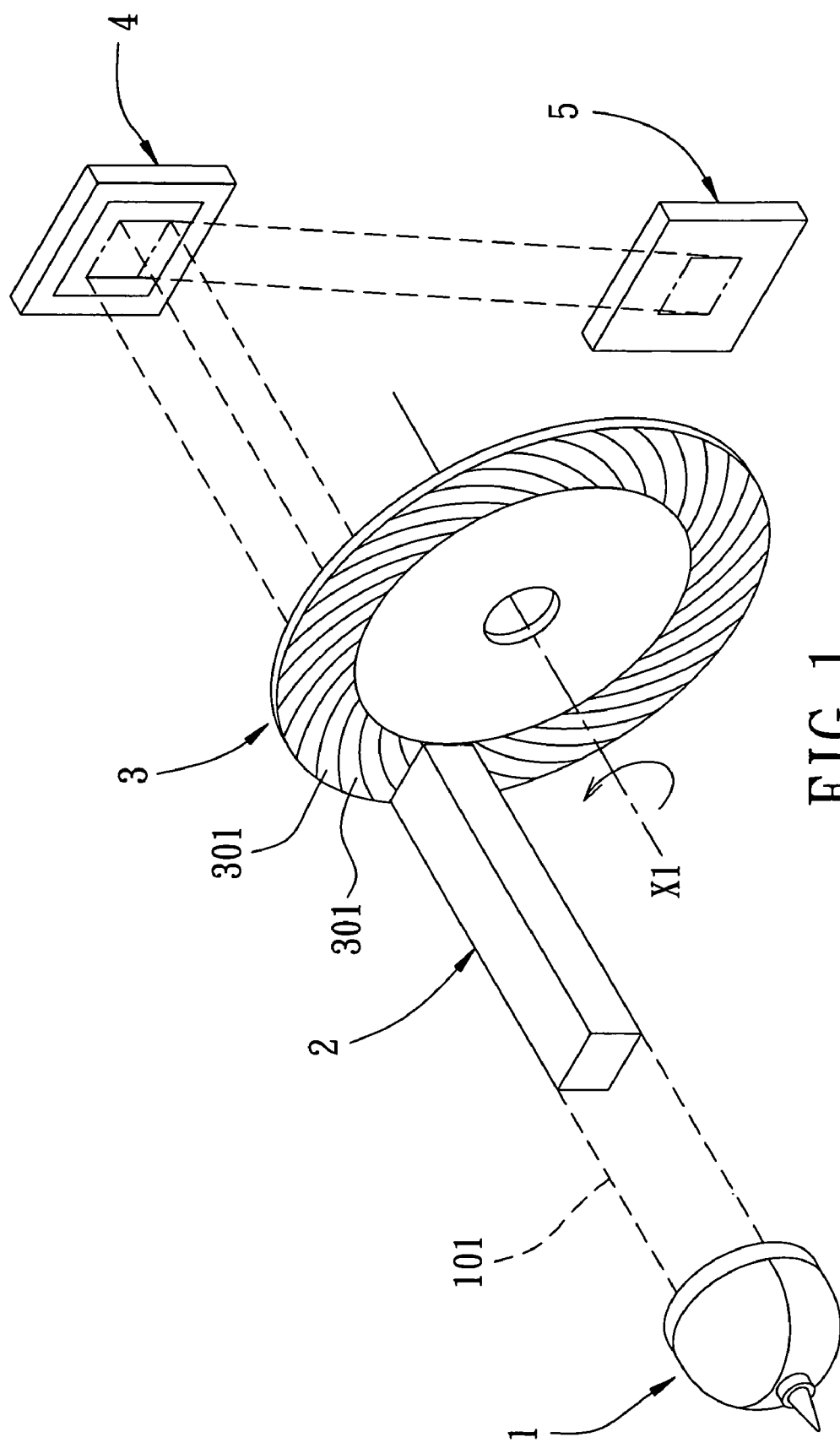
FIG. 1 is a schematic view of a conventional optical projecting system.

Before the present invention is described in greater detail, it should be noted herein that like elements are denoted by the same reference numerals throughout the disclosure.

Figure 4:
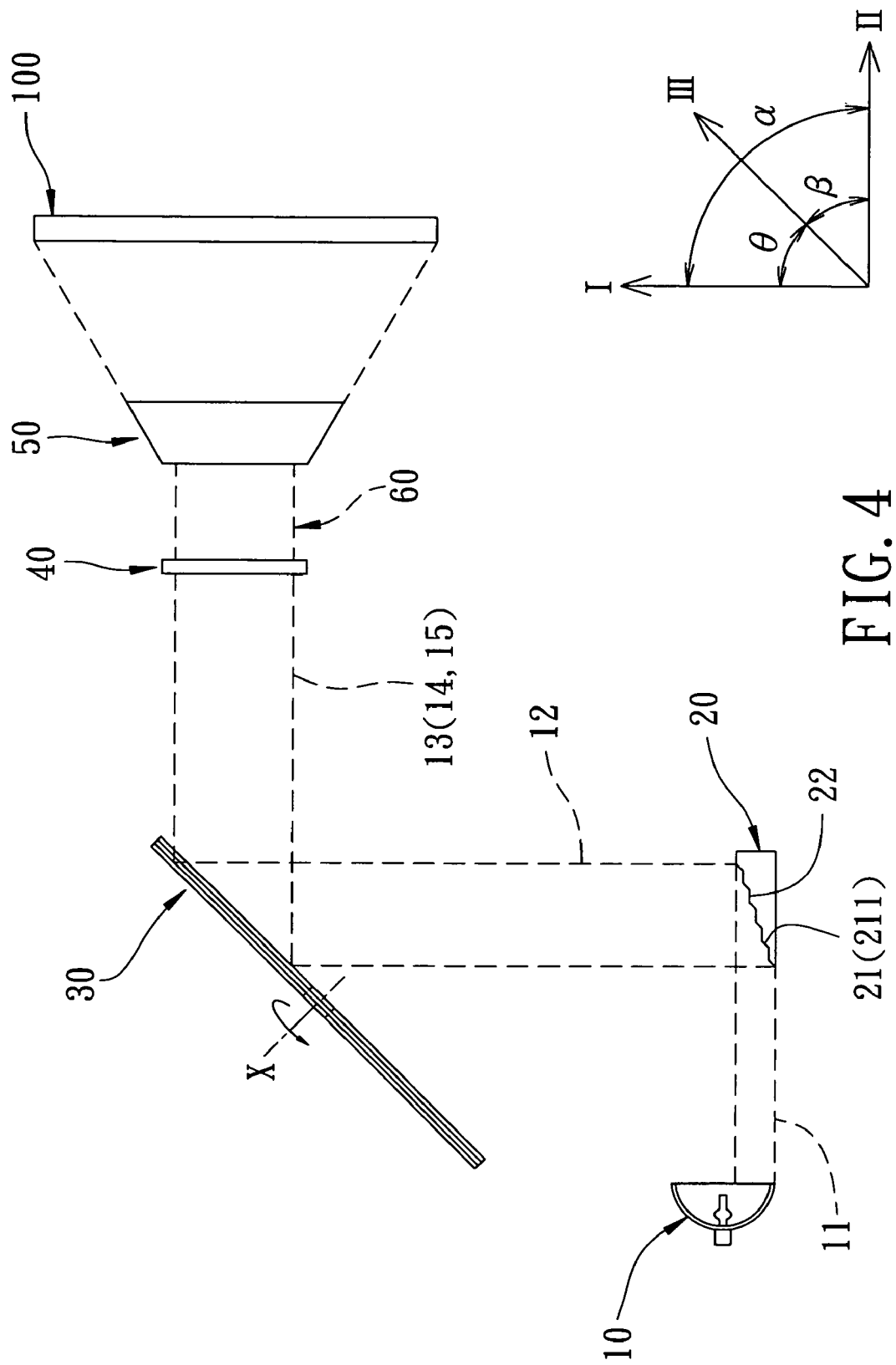
FIG. 4 is a schematic view of the first preferred embodiment of an optical projecting system according to the present invention.
Figure 5:
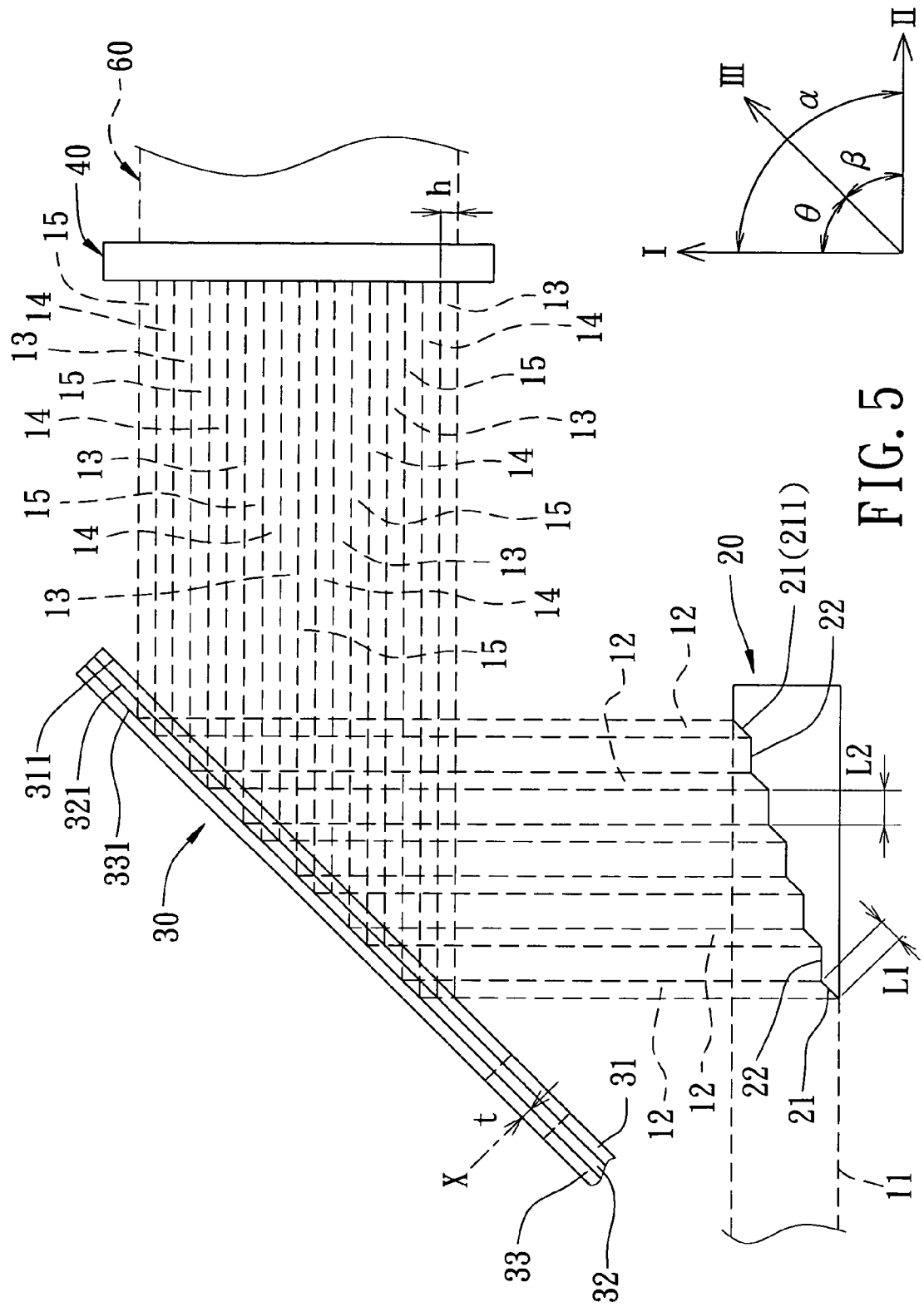
FIG. 5 is an enlarged fragmentary view of FIG. 4.

As shown in FIG. 4 and FIG. 5, the first preferred embodiment of an optical projecting system according to the present invention includes a light source 10, a light-splitting unit 20, a reflective color wheel 30, a light-modulating unit 40, and a projecting lens 50. The optical projecting system is for projecting colored images on a screen 100.

The light source 10 is capable of providing composite source light 11.

The light-splitting unit 20 receives the composite source light 11 provided by the light source 10, and splits the composite source light 11 into a plurality of composite light beam components 12 that travel in a first direction (I). In this embodiment, the light-splitting unit 20 includes a plurality of light-guiding surface segments 21 that are spaced apart from each other in a second direction (II). The light-guiding surface segments 21 are each provided with a reflective film 211 so as to reflect the composite source light 11 from the light source 10 in the first direction (I) toward the reflective color wheel 30 to result in the composite light beam components 12. Each of the light-guiding surface segments 21 extends in a third direction (III), and has a first length (L1) extending in the third direction (III). The first and third directions (I), (III) define a first angle $\theta$ therebetween. The first and second directions (I), (II) define a second angle $\alpha$ therebetween that is equal to 180 degrees minus twice the first angle $\theta$. The second and third directions (II), (III) define a third angle $\beta$ therebetween. In this embodiment, the first angle $\theta$ is equal to 45 degrees. Therefore, the second angle $\alpha$ is equal to 90 degrees ($\alpha=180°-2\times45°=90°$). Consequently, the third angle $\beta$ is equal to the second angle $\alpha$ subtracted by the first angle $\theta$, i.e., $\beta=\alpha-\theta=90°-45°=45°$. In this embodiment, the light-splitting unit 20 includes six of the light-guiding surface segments 21.

The light-splitting unit 20 further includes a plurality of connecting surface segments 22 that extend in the second direction (II). Each of the connecting surface segments 22 interconnects an adjacent pair of the light-guiding surface segments 21, and has a second length (L2) extending in the second direction (II).

In this embodiment, the light source 10 provides the composite source light 11 in the second direction (II) to the light-splitting unit 20. The reflective films 211 of the light-guiding surface segments 21 reflect the composite source light 11 in the first direction (I) to result in the composite light beam components 12. In order to prevent the connecting surface segments 22 from creating interference light beams when the composite source light 11 is incident thereupon, the connecting surface segments 22 can be light-transmissive or can be provided with light-absorbing films, respectively.

Figure 6:
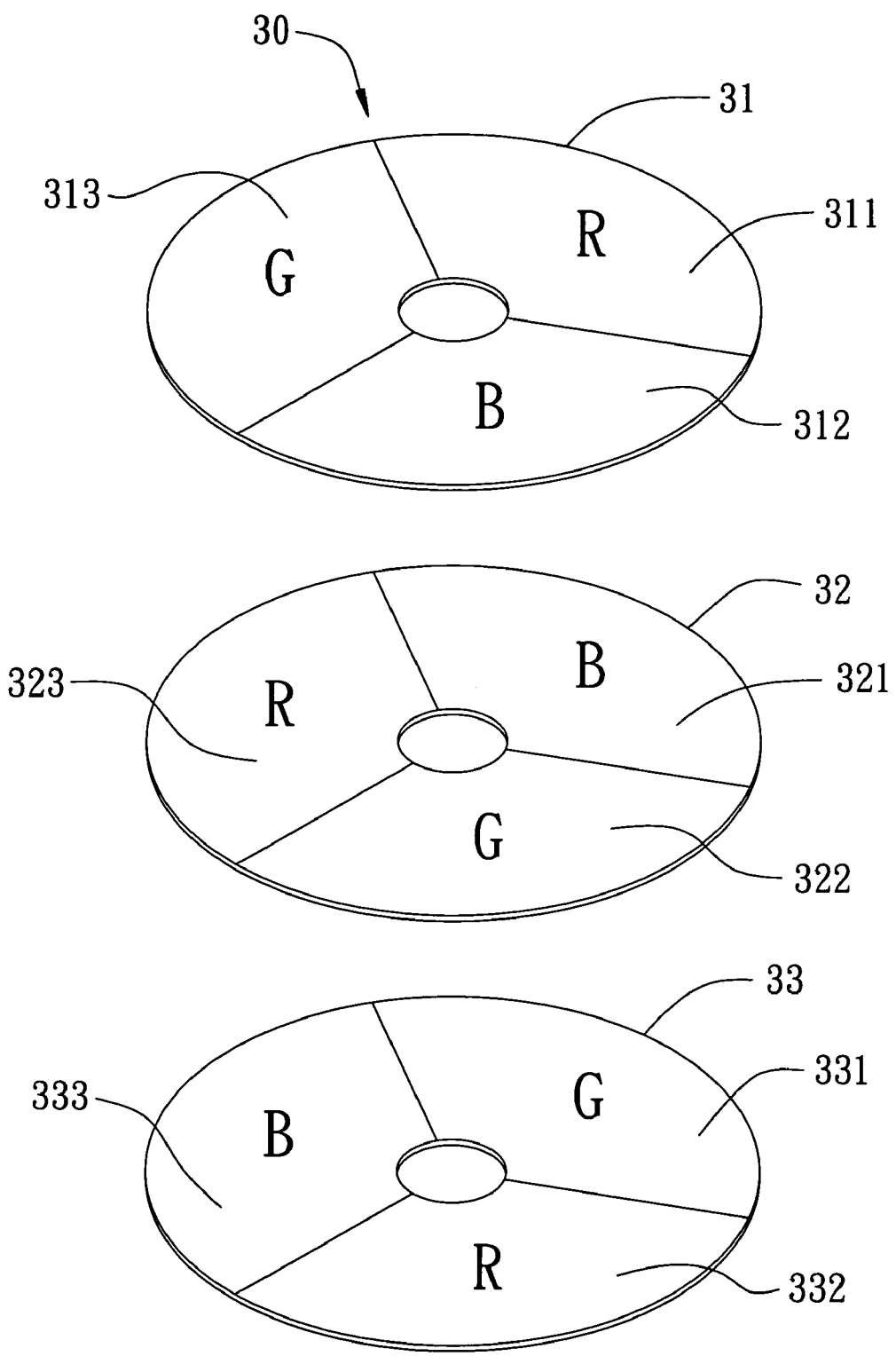
FIG. 6 is an exploded perspective view of a reflective color wheel according to the first preferred embodiment.
Figure 7:
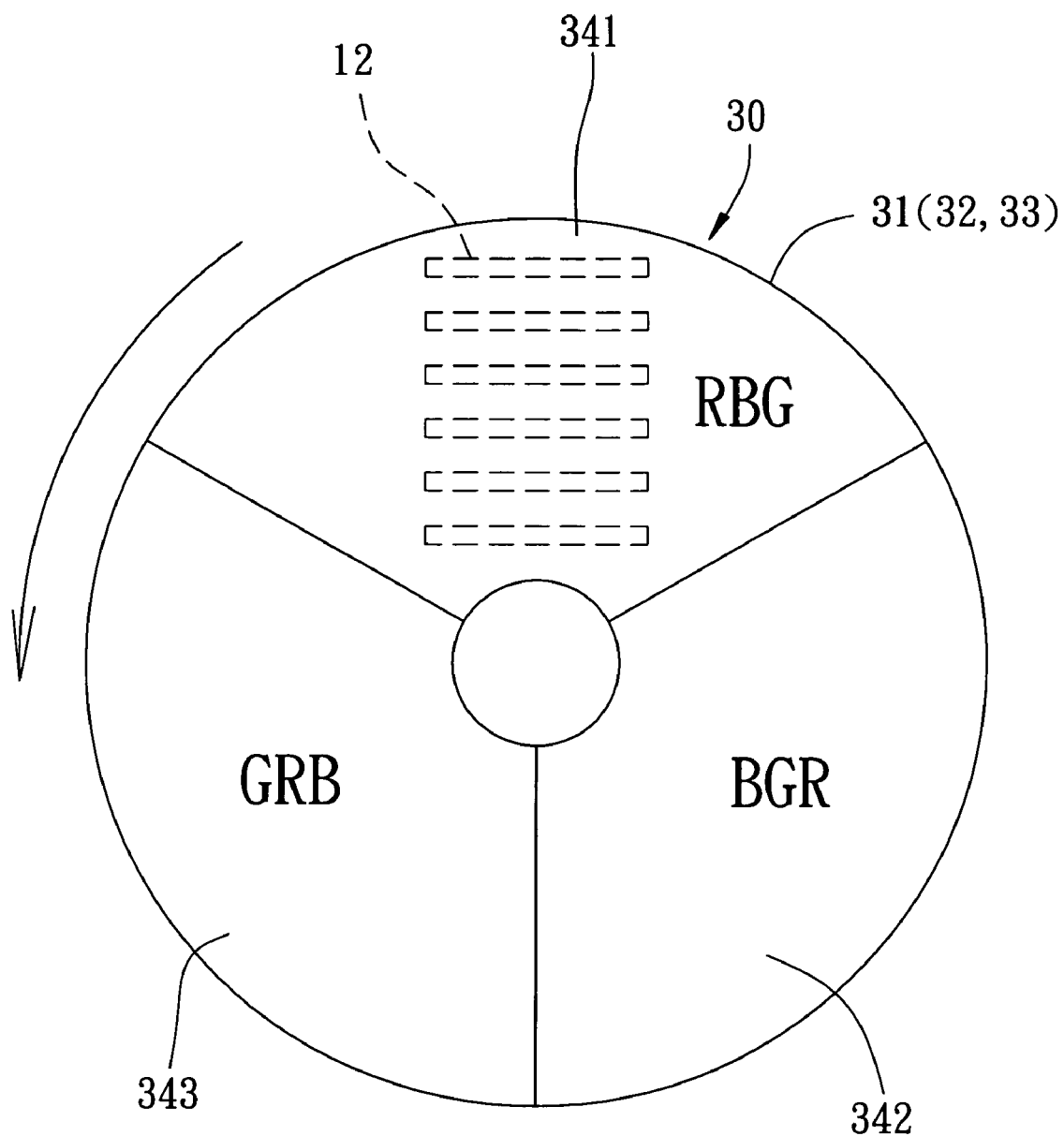
FIG. 7 is a schematic view of the reflective color wheel according to the first preferred embodiment, illustrating composite light beam components incident thereon.

The reflective color wheel 30 is disposed to receive the composite light beam components 12 from the light-splitting unit 20, and is rotatable about a rotation axis (X) transverse to a plane that is parallel to the third direction (III). Rotation of the reflective color wheel 30 can be driven by a motor (not shown). With further reference to FIG. 6 and FIG. 7, the reflective color wheel 30 includes a stack of light-filtering plates disposed parallel to the plane such that the reflective color wheel 30 is parallel to the light-guiding surface segments 21 of the light-splitting unit 20. In this embodiment, the stack of the light-filtering plates includes first, second and third light-filtering plates 31, 32, 33. Each of the first, second and third light-filtering plates 31, 32, 33 has a thickness (t) along the rotation axis (X). In this embodiment, the stacked first, second and third light-filtering plates 31, 32, 33 altogether constitute first, second and third multi-layer light-reflecting sections 341, 342, 343 for further splitting each of the composite light beam components 12 into a plurality of colored light beam components 13, 14, 15. Each of the first, second and third multi-layer light-reflecting sections 341, 342, 343 includes a plurality of light-filtering layers stacked along the rotation axis (X).

Each of the first, second and third light-filtering plates 31, 32, 33 includes a plurality of light-filtering segments around the rotation axis (X). In this embodiment, the light-filtering segments of each of the first, second and third light-filtering plates 31, 32, 33 include first, second and third light-filtering segments. In particular, the first light-filtering plate 31 includes first, second and third light-filtering segments 311, 312, 313. The second light-filtering plate 32 includes first, second and third light-filtering segments 321, 322, 323. The third light-filtering plate 33 includes first, second and third light-filtering segments 331, 332, 333. Those light-filtering segments that are aligned along the rotation axis (X) constitute the light-filtering layers of a corresponding one of the first, second and third multi-layer light-reflecting sections 341, 342, 343. In particular, the first light-filtering segments 311, 321, 331 of the first, second and third light-filtering plates 31, 32, 33 are aligned along the rotation axis (X), and constitute the light-filtering layers of the first multi-layer light-reflecting section 341. The second light-filtering segments 312, 322, 332 of the first, second and third light-filtering plates 31, 32, 33 are aligned along the rotation axis (X), and constitute the light-filtering layers of the second multi-layer light-reflecting section 342. The third light-filtering segments 313, 323, 333 of the first, second and third light-filtering plates 31, 32, 33 are aligned along the rotation axis (X), and constitute the light-filtering layers of the third multi-layer light-reflecting section 343.

Each of the light-filtering layers of each of the first, second and third multi-layer light-reflecting sections 341, 342, 343 is capable of reflecting light within a predefined distinct wavelength range, and permits transmission of light outside the predefined distinct wavelength range therethrough. It is noted that sequences of the light-filtering layers of an adjacent pair of the multi-layer light-reflecting sections 341, 342, 343 are different from each other.

In this embodiment, the first, second and third light-filtering segments 311, 312, 313 of the first light-filtering plate 31 are capable of reflecting light within first, second and third predefined distinct wavelength ranges (R), (B), (G), respectively. The first, second and third predefined distinct wavelength ranges (R), (B), (G) correspond to wavelength ranges of red, blue and green light, respectively. The first, second and third light-filtering segments 321, 322, 323 of the second light-filtering plate 32 are capable of reflecting light within the second, third and first predefined distinct wavelength ranges (B), (G), (R), respectively. The first, second and third light-filtering segments 331, 332, 333 of the third light-filtering plate 33 are capable of reflecting light within the third, first and second predefined distinct wavelength ranges (G), (R), (B), respectively.

As the composite light beam components 12 reach the first multi-layer light-reflecting section 341 of the reflective color wheel 30, the light-filtering layers thereof, i.e., the first light-filtering segments 311, 321, 331 of the first, second and third light-filtering plates 31, 32, 33, further split each of the composite light beam components 12 into first, second and third colored light beam components 13, 14, 15 in sequence. The first, second and third colored light beam components 13, 14, 15 are light beam components within the first, second and third predefined distinct wavelength ranges (R), (B), (G), respectively. In other words, the first, second and third colored light beam components 13, 14, 15 are red, blue and green light beam components, respectively. As the composite light beam components 12 reach the second multi-layer light-reflecting section 342 of the reflective color wheel 30, the light-filtering layers thereof, i.e., the second light-filtering segments 312, 322, 332 of the first, second and third light-filtering plates 31, 32, 33, further split each of the composite light beam components 12 into second, third and first colored light beam components 14, 15, 13 in sequence. As the composite light beam components 12 reach the third multi-layer light-reflecting section 343 of the reflective color wheel 30, the light-filtering layers thereof, i.e., the third light-filtering segments 313, 323, 333 of the first, second and third light-filtering plates 31, 32, 33, further split each of the composite light beam components 12 into third, first and second colored light beam components 15, 13, 14 in sequence.

In this embodiment, since there are six of the light-guiding surface segments 21, and since each of the first, second and third multi-layer light-reflecting sections 341, 342, 343 includes three light-filtering layers, the composite source light 11 is split into six composite light beam components 12, each of which is further split into the first, second and third colored light beam components 13, 14, 15 by the reflective color wheel 30. In other words, there are a total of eighteen colored light beam components 13, 14, 15 available from the reflective color wheel 30 in this embodiment.

The light-modulating unit 40 is disposed to receive the first, second and third colored light beam components 13, 14, 15 reflected by the reflective color wheel 30 theretoward, and is operable to modulate the first, second and third colored light beam components 13, 14, 15. In this embodiment, the light-modulating unit 40 is a transmissive liquid crystal device, and is disposed between the reflective color wheel 30 and the projecting lens 50. It should be noted herein that depending on a particular design of the optical projecting system, the light-modulating unit 40 can also be a reflective liquid crystal device or a digital micro-mirror device (DMD).

Figure 8A:
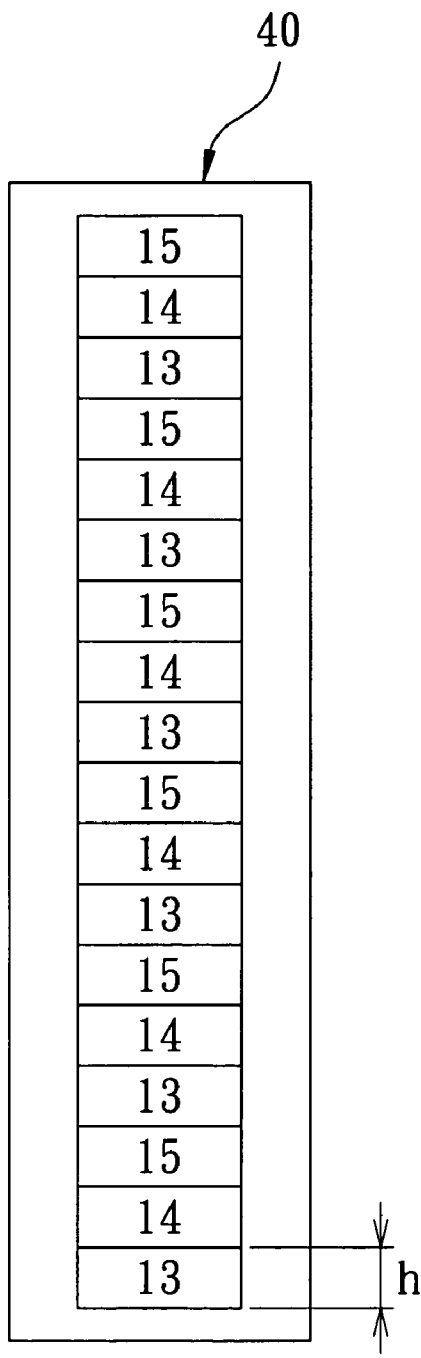
FIG. 8A to 8C are schematic views, illustrating sequences of colored light beam components reflected by first, second and third multi-layer light-reflecting sections of the reflective color wheel and incident on a light-modulating unit of the first preferred embodiment.
Figure 8B:
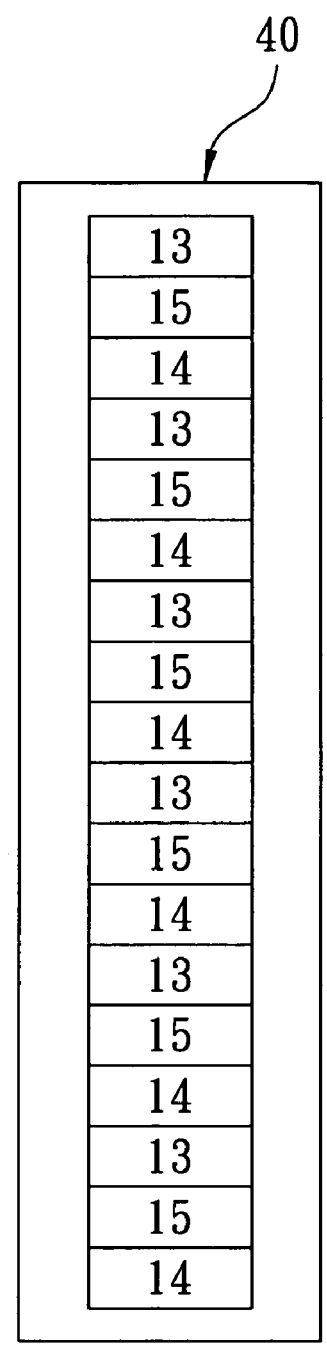
Figure 8C:
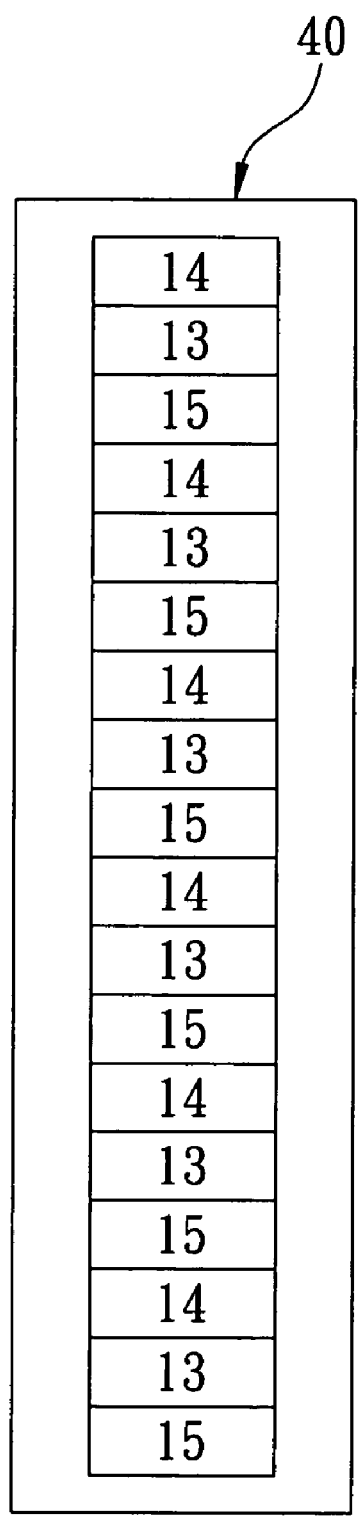

With further reference to FIGS. 8A, 8B and 8C, the first, second and third colored light beam components 13, 14, 15 are lined up sequentially and cyclically on the light-modulating unit 40. FIGS. 8A, 8B, 8C respectively illustrate the distribution of the first, second and third colored light beam components 13, 14, 15 that were reflected by the first, second and third multi-layer light-reflecting sections 341, 342, 343 and that are incident on the light-modulating unit 40. Each of the first, second and third colored light beam components 13, 14, 15 has a predefined height (h) on the light-modulating unit 40. In order to achieve this, the first length (L1) of each of the light-guiding surface segments 21 has to be equal in magnitude to the predefined height (h) of each of the first, second and third colored light beam components 13, 14, 15 divided by sine of the first angle θ, i.e., L1=h/sin θ, the second length (L2) of each of the connecting surface segments 22 has to be equal in magnitude to twice the predefined height (h) of each of the first, second and third colored light beam components 13, 14, 15 divided by tangent of the first angle θ, i.e., L2=2×h/tan θ, and the thickness (t) of each of the first, second and third light-filtering plates 31, 32, 33 has to be equal in magnitude to the predefined height (h) of each of the first, second and third colored light beam components 13, 14, 15 multiplied by cosine of the first angle θ, i.e., t=h×cos θ.

Since the reflective color wheel 30 rotates at a high speed, the first, second and third multi-layer light-reflecting sections 341, 342, 343 of the reflective color wheel 30 take turns in reflecting the first, second and third colored light beam components 13, 14, 15 toward the light-modulating unit 40. Therefore, for every predefined height (h) on the light-modulating unit 40, the first, second and third colored light beam components 13, 14, 15 are illuminated thereon cyclically.

Referring back to FIG. 4 and FIG. 5, the projecting lens 50 is disposed between the light-modulating unit 40 and the screen 100 to receive modulated light beam components, which altogether form an image light 60, from the light-modulating unit 40. The projecting lens 50 focuses and projects the image light 60 onto the screen 100 to form colored images thereon.

In sum, the optical projecting system according to the first preferred embodiment of the present invention has the following advantages:

1. The reflective color wheel 30 is comprised of the first, second and third multi-layer light-reflecting sections 341, 342, 343, the light-filtering layers of each of which is capable of reflecting light within the first, second and third predefined distinct wavelength ranges (R), (B), (G), respectively. The first multi-layer light-reflecting section 341 is capable of reflecting light within the first, second and third predefined distinct wavelength ranges (R), (B), (G) in sequence to result in the first, second and third colored light beam components 13, 14, 15. The second multi-layer light-reflecting section 342 is capable of reflecting light within the second, third and first predefined distinct wavelength ranges (B), (G), (R) in sequence to result in the second, third and first colored light beam components 14, 15, 13. The third multi-layer light-reflecting section 343 is capable of reflecting light within the third, first and second predefined distinct wavelength ranges (G), (R), (B) in sequence to result in the third, first and second colored light beam components 15, 13, 14.

Figure 2:
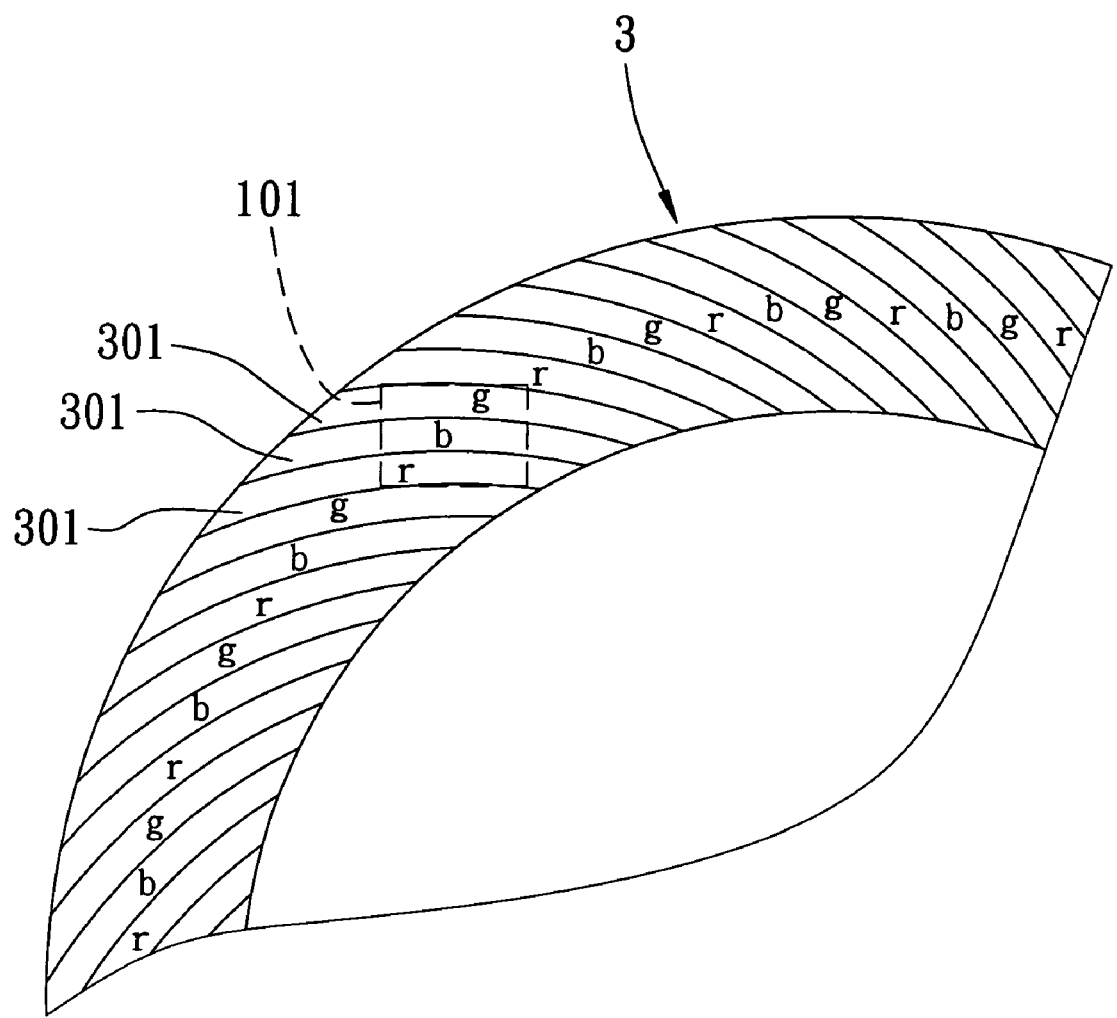
FIG. 2 is a fragmentary schematic view of a transmissive color wheel used in the conventional optical projecting system.
Figure 3:
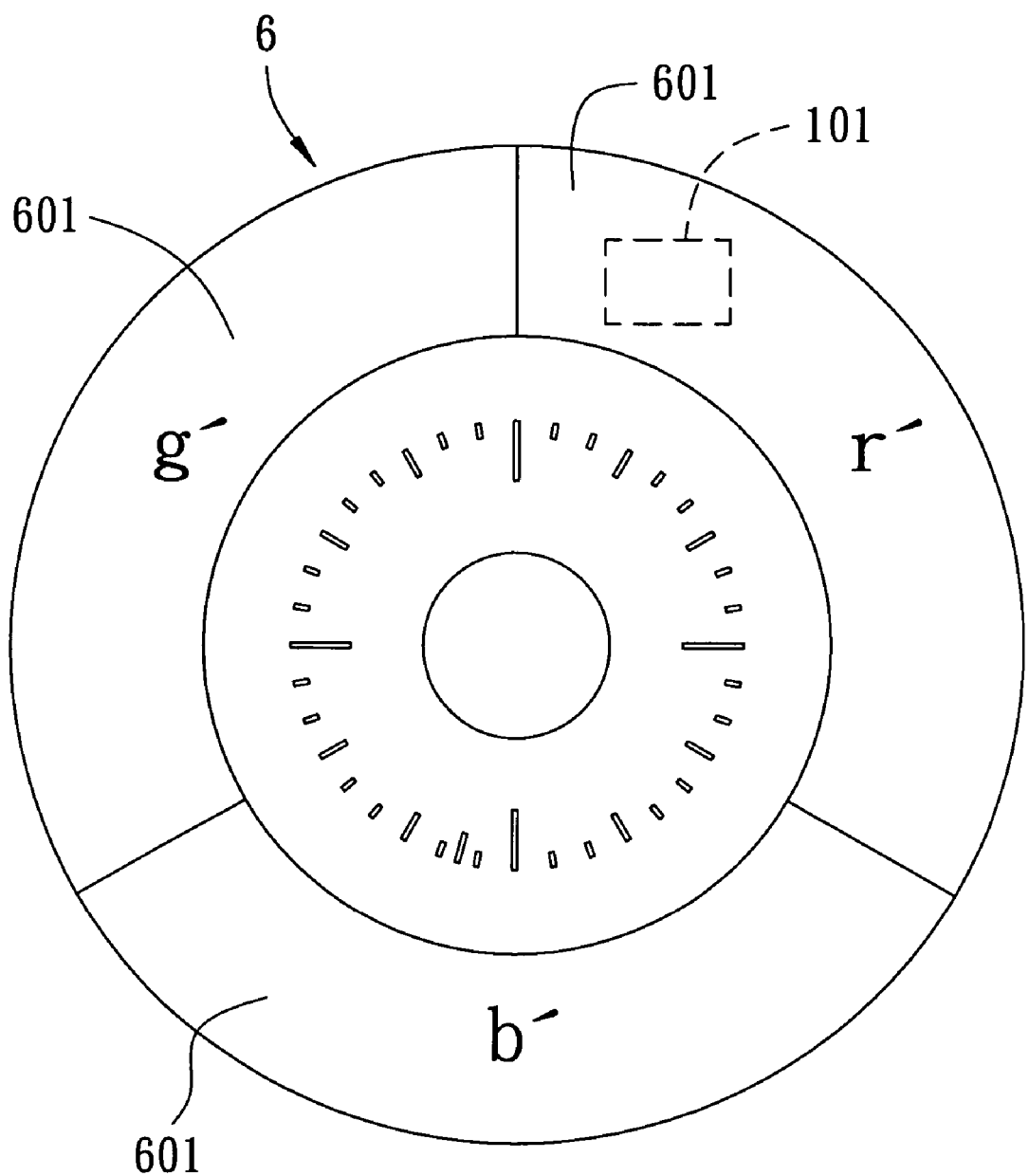
FIG. 3 is a schematic view of a transmissive color wheel used in a modified conventional optical projecting system.

Regardless of which of the first, second and third multi-layer light-reflecting sections 341, 342, 343 the composite light beam components 12 reach, all three of the first, second and third colored light beam components 13, 14, 15 will be reflected toward the light-modulating unit 40 with minimal loss in light energy. Therefore, the present invention not only reduces the losses in light energy as compared to the color wheels 3, 6 (shown in FIG. 2 and FIG. 3) of the prior art, but also improves upon brightness of the images projected on the screen 100.

2. The light tunnel 2 (shown in FIG. 1) is not required for light-guiding and light-focusing purposes, and the reflective color wheel 30 does not waste any light energy, such that overheating of the light tunnel 2 in the prior art is completely eliminated. In addition, the possibility of the first, second and third colored light beam components 13, 14, 15 being reflected back toward the light-splitting unit 20 to result in overheating of the light-splitting unit 20 is also avoided.

3. Since the light source 10, the light-splitting unit 20 and the reflective color wheel 30 are not aligned with and are spaced apart from each other, the length of the optical projecting system according to the present invention is shorter than that of the prior art.

Figure 9:
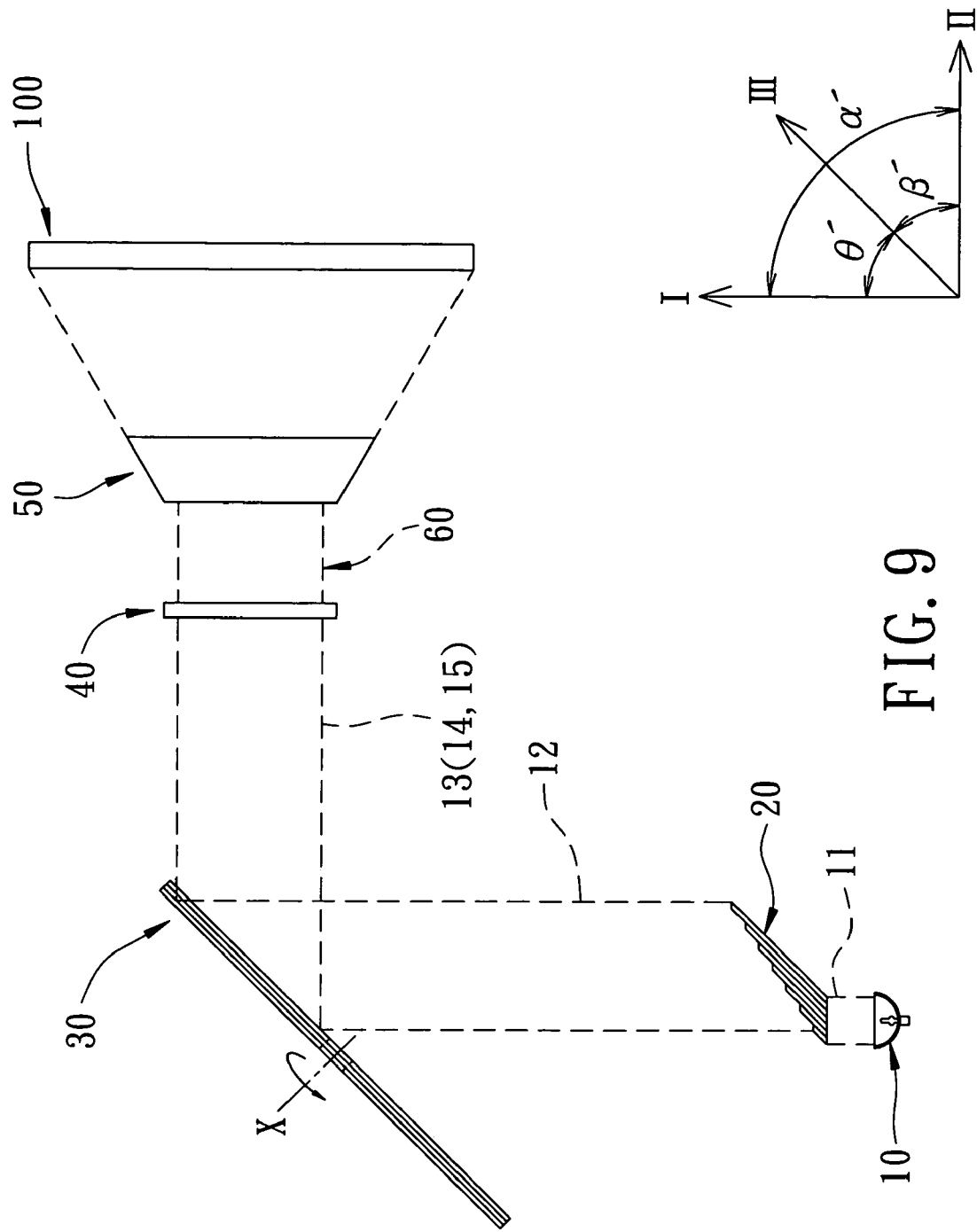
FIG. 9 is a schematic view of the second preferred embodiment of an optical projecting system according to the present invention.
Figure 10:
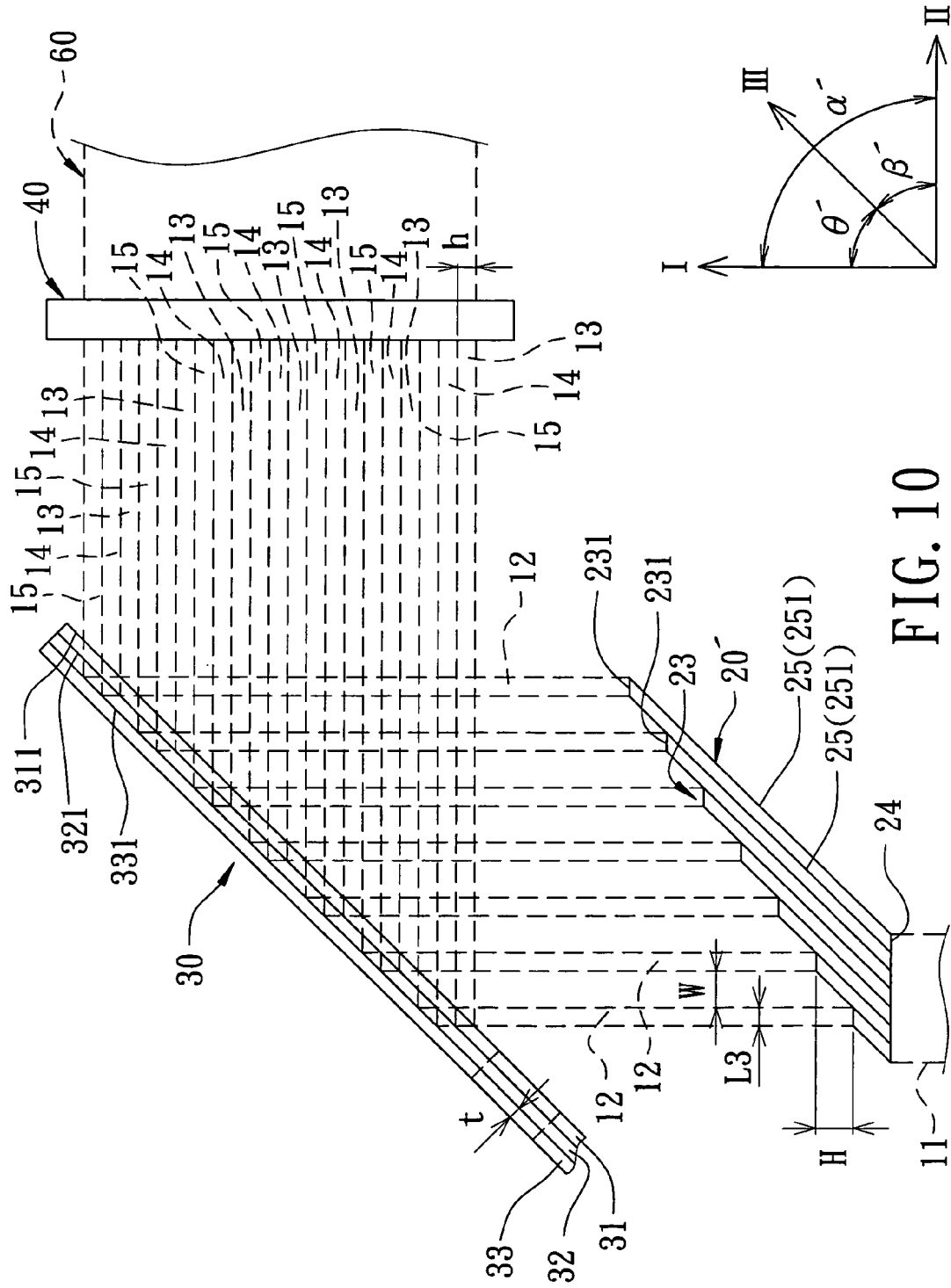
FIG. 10 is an enlarged fragmentary schematic view of FIG. 9.

As shown in FIG. 9 and FIG. 10, the second preferred embodiment of an optical projecting system according to the present invention differs from the first preferred embodiment mainly in the light-splitting unit 20'.

The light-splitting unit 20' includes a light-incident side 24 for receiving the composite source light 11 from the light source 10, and a light-exit side 23 having a plurality of light-transmissive light-exit parts 231 that respectively permit transmission of the composite source light 11 therethrough to result in the composite light beam components 12 that travel in the first direction (I) toward the reflective color wheel 30. The light-exit parts 231 extend in the second direction (II) transverse to the first direction (I). In this embodiment, the light-exit side 23 includes seven of the light-exit parts 231. The light-splitting unit 20' further includes a plurality of connecting surface segments 25 that extend respectively from the light-incident side 24 to the light-exit parts 231 of the light-exit side 23 in the third direction (III) parallel to the plane that is transverse to the rotation axis (X). Each of the connecting surface segments 25 is provided with a reflective film 251, and spaces apart a corresponding adjacent pair of the light-exit parts 231 in the first direction (I) by a second height (H) and in the second direction (II) by a width (W).

In this embodiment, the light source 10 provides the composite source light 11 in the first direction (I) to the light-incident side 24 of the light-splitting unit 20'. When the composite source light 11 enters the light-splitting unit 20' via the light-incident side 24, the composite source light 11 goes through multiple internal reflections within the light-splitting unit 20' due to the reflective films 251 of the connecting surface segments 25 and eventually exits the light-splitting unit 20' via the light-exit parts 231 of the light-exit side 23 to result in the composite light beam components 12.

The first and third directions (I), (III) define a first angle θ' therebetween. The first and second directions (I), (II) define a second angle α' therebetween. The second and third directions (II), (III) define a third angle β' therebetween that is equal to the second angle α' subtracted by the first angle θ'. In this embodiment, the first angle θ' is equal to 45 degrees, and the second angle α' is equal to 90 degrees. Therefore, the third angle β' is equal to 45 degrees (β'=α'−θ'=90°−45°=45°).

As with the first preferred embodiment, each of the first, second and third colored light beam components 13, 14, 15 has a predefined first height (h) on the light-modulating unit 40.

Each of the light-exit parts 231 has a length (L3) in the second direction (II) that is equal to the predefined first height (h) of each of the first, second and third colored light beam components 13, 14, 15 multiplied by tangent of the first angle θ', i.e., L3=h×tan θ'. The second height (H) between each adjacent pair of the light-exit parts 231 in the first direction (I) is equal to twice the predefined first height (h) of each of the first, second and third colored light beam components 13, 14, 15, i.e., H=2×h. The width (W) between each adjacent pair of the light-exit parts 231 in the second direction (II) is equal to twice the predefined first height (h) of the colored light beam components 13, 14, 15 multiplied by tangent of the first angle θ', i.e., W=2×h×tan θ'.

Each of the first, second and third light-filtering plates 31, 32, 33 has a thickness (t) along the rotation axis (X), and equal in magnitude to the predefined first height (h) of each of the first, second and third colored light beam components 13, 14, 15 multiplied by sine of the first angle θ', i.e., t=h×sin θ'.

As the composite light beam components 12 reach the reflective color wheel 30, they are reflected by the first, second and third multi-layer light-reflecting sections 341, 342, 343 to result in the colored light beam components 13, 14, 15 that travel toward the light-modulating unit 40. As a result, the second preferred embodiment can attain the same advantages as the first preferred embodiment.

Figure 11:
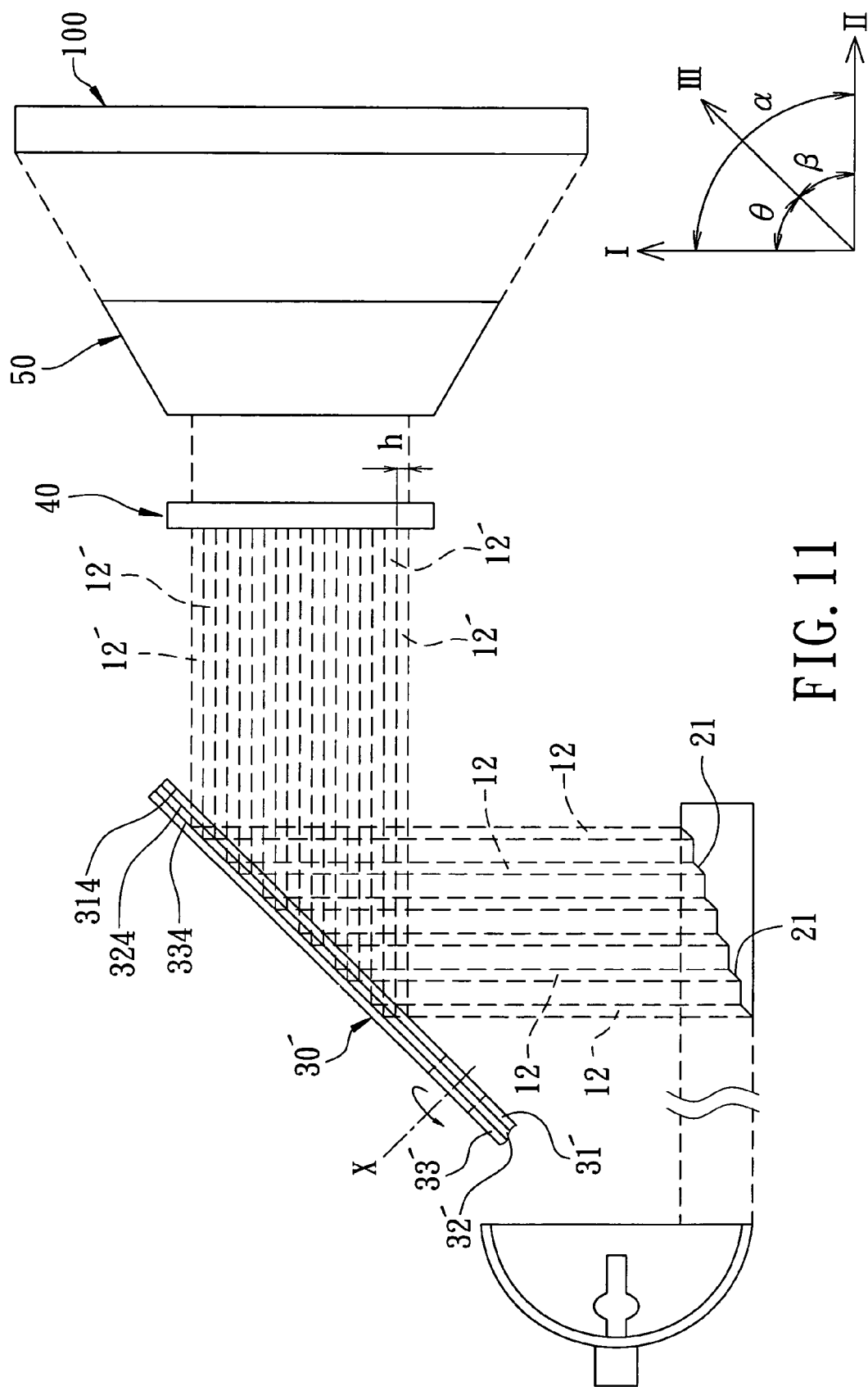
FIG. 11 is a schematic view of the third preferred embodiment of an optical projecting system according to the present invention.
Figure 12:
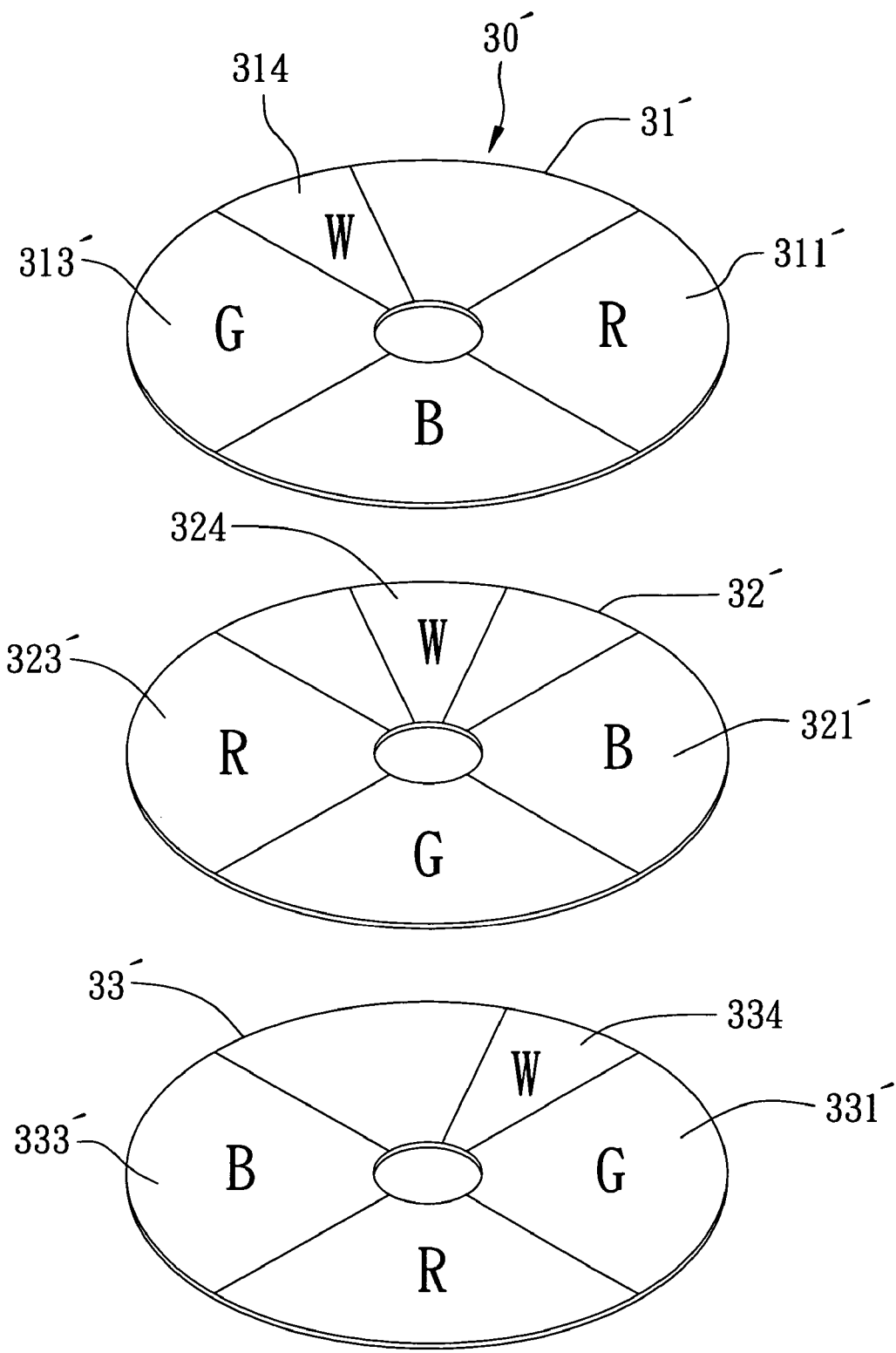
FIG. 12 is an exploded perspective view of a reflective color wheel according to the third preferred embodiment.
Figure 13:
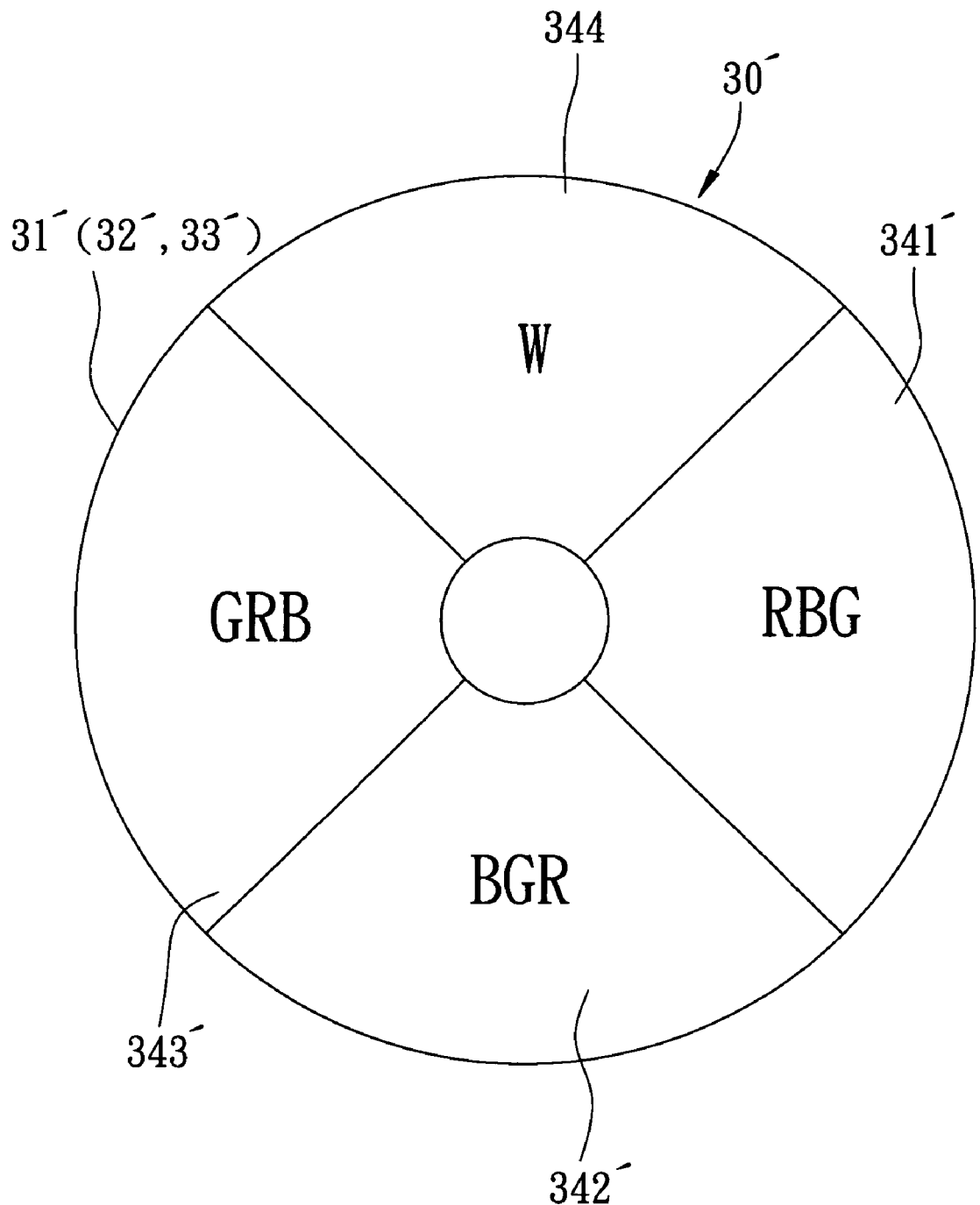
FIG. 13 is a schematic view of the reflective color wheel according to the third preferred embodiment.

As shown in FIG. 11, FIG. 12 and FIG. 13, the third preferred embodiment of an optical projecting system according to the present invention differs from the first preferred embodiment in the reflective color wheel 30'.

As compared to the reflective color wheel 30 in the first preferred embodiment, the reflective color wheel 30' further includes a multi-layer composite light reflector 344 between an adjacent pair of the first, second and third multi-layer light-reflecting sections 341', 342', 343' for reflecting the composite light beam components 12 toward the light-modulating unit 40 without splitting the composite light beam components 12 into the colored light beam components 13, 14, 15. In other words, the multi-layer composite light reflector 344 is capable of reflecting light within the wavelength range of white light (W). In this embodiment, the multi-layer composite light reflector 344 is disposed between the first and third multi-layer light-reflecting sections 341', 343'.

Each of the first, second and third light-filtering plates 31', 32', 33' further includes a composite-light-reflecting segment 314, 324, 334. The composite-light-reflecting segments 314, 324, 334 of the light-filtering plates 31', 32', 33' are staggered relative to each other along the rotation axis (X), and constitute the multi-layer composite light reflector 344 of the reflective color wheel 30'. In this embodiment, the composite-light-reflecting segment 314 of the first light-filtering plate 31' is disposed between the first and third light-filtering segments 311', 313', and is proximate to the third light-filtering segment 313'. The composite-light-reflecting segment 324 of the second light-filtering plate 32' is disposed midway between the first and third light-filtering segments 321', 323'. The composite-light-reflecting segment 334 of the third light-filtering plate 33' is disposed between the first and third light-filtering segments 331', 333', and is proximate to the first light-filtering segment 331'.

As shown in FIG. 11, each of the composite light beam components 12 that reach the multi-layer composite light reflector 344 of the reflective color wheel 30' are reflected toward the light-modulating unit 40 as three composite light beam subcomponents 12', each of which has a predefined height (h) on the light-modulating unit 40. With the addition of the multi-layer composite light reflector 344 in the reflective color wheel 30', not only are the advantages of the first preferred embodiment achieved, but brightness and contrast of the images projected by the projecting lens 50 onto the screen 100 are also enhanced.

In conclusion, the optical projecting system according to the present invention effectively reduces the losses in light energy and the overall size thereof, and can improve the brightness of images projected thereby.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. An optical projecting system comprising:
   a light source capable of providing composite source light;
   a light-splitting unit for receiving the composite source light provided by said light source, and for splitting the composite source light into a plurality of composite light beam components that travel in a first direction;
   a reflective color wheel disposed to receive the composite light beam components from said light-splitting unit, rotatable about a rotation axis, and including a plurality of multi-layer light-reflecting sections for further splitting each of the composite light beam components into a plurality of colored light beam components,
   each of said multi-layer light-reflecting sections including a plurality of light-filtering layers stacked along the rotation axis, each of said light-filtering layers of each of said multi-layer light-reflecting sections being capable of reflecting light within a predefined distinct wavelength range, and permitting transmission of light outside the predefined distinct wavelength range therethrough, wherein sequences of said light-filtering layers of an adjacent pair of said multi-layer light-reflecting sections are different from each other;
   a light-modulating unit disposed to receive the colored light beam components from said reflective color wheel, and operable to modulate the colored light beam components; and
   a projecting lens disposed to receive modulated light beam components from said light-modulating unit.

2. The optical projecting system as claimed in claim 1, wherein said reflective color wheel includes a stack of light-filtering plates disposed parallel to a plane that is transverse to the rotation axis, each of said light-filtering plates including a plurality of light-filtering segments around the rotation axis, and
   wherein said light-filtering segments of said light-filtering plates which are aligned along the rotation axis constitute said light-filtering layers of a corresponding one of said multi-layer light-reflecting sections of said reflective color wheel.

3. The optical projecting system as claimed in claim 2, wherein said stack of said light-filtering plates includes first, second and third light-filtering plates, said light-filtering segments of each of said first, second and third light-filtering plates including first, second and third light-filtering segments;
   wherein said first, second and third light-filtering segments of said first light-filtering plate reflect light within first, second and third predefined distinct wavelength ranges, respectively;
   wherein said first, second and third light-filtering segments of said second light-filtering plate reflect light within the second, third and first predefined distinct wavelength ranges, respectively;
   wherein said first, second and third light-filtering segments of said third light-filtering plate reflect light within the third, first and second predefined distinct wavelength ranges, respectively;
   wherein said first light-filtering segments of said first, second and third light-filtering plates are aligned along the rotation axis and constitute said light-filtering layers of a first one of said multi-layer light-reflecting sections of said reflective color wheel;
   wherein said second light-filtering segments of said first, second and third light-filtering plates are aligned along the rotation axis and constitute said light-filtering layers of a second one of said multi-layer light-reflecting sections of said reflective color wheel; and
   wherein said third light-filtering segments of said first, second and third light-filtering plates are aligned along the rotation axis and constitute said light-filtering layers of a third one of said multi-layer light-reflecting sections of said reflective color wheel.

4. The optical projecting system as claimed in claim 2, wherein said light-splitting unit includes a plurality of light-guiding surface segments that are spaced apart from each other in a second direction, said light-guiding surface segments of said light-splitting unit being capable of reflecting the composite source light from said light source in the first direction toward said reflective color wheel to result in the composite light beam components.

5. The optical projecting system as claimed in claim 4, wherein each of said light-guiding surface segments of said light-splitting unit extends in a third direction parallel to the plane that is transverse to the rotation axis, and has a first length extending in the third direction;
   wherein the first and third directions define a first angle therebetween;
   wherein the first and second directions define a second angle therebetween that is equal to 180 degrees minus twice the first angle.

6. The optical projecting system as claimed in claim 5, wherein each of the colored light beam components has a predefined height on said light-modulating unit; and
   wherein the first length of each of said light-guiding surface segments is equal in magnitude to the predefined height of each of the colored light beam components divided by sine of the first angle.

7. The optical projecting system as claimed in claim 6, wherein said light-splitting unit further includes a plurality of connecting surface segments extending in the second direction, each of said connecting surface segments interconnecting an adjacent pair of said light-guiding surface segments.

8. The optical projecting system as claimed in claim 7, wherein each of said connecting surface segments has a second length extending in the second direction and equal in magnitude to twice the predefined height of each of the colored light beam components divided by tangent of the first angle.

9. The optical projecting system as claimed in claim 8, wherein each of said light-filtering plates has a thickness along the rotation axis, and equal in magnitude to the predefined height of each of the colored light beam components multiplied by cosine of the first angle.

10. The optical projecting system as claimed in claim 4, wherein said light source provides the composite source light in the second direction to said light-splitting unit.

11. The optical projecting system as claimed in claim 5, wherein the first angle is 45 degrees.

12. The optical projecting system as claimed in claim 2, wherein said light-splitting unit includes a light-incident side for receiving the composite source light from said light source, and a light-exit side having a plurality of light-transmissive light-exit parts that respectively permit transmission of the composite source light therethrough to result in the composite light beam components that travel in the first direction toward said reflective color wheel.

13. The optical projecting system as claimed in claim 12, wherein said light-exit parts extend in a second direction transverse to the first direction.

14. The optical projecting system as claimed in claim 13, wherein each of the colored light beam components has a predefined first height on said light-modulating unit,
wherein the first direction defines an angle with the plane that is transverse to the rotation axis, and
wherein each of said light-exit parts has a length in the second direction that is equal to the predefined first height of each of the colored light beam components multiplied by tangent of the angle.

15. The optical projecting system as claimed in claim 14, wherein said light-splitting unit further includes a plurality of connecting surface segments that extend respectively from said light-incident side to said light-exit parts of said light-exit side in a third direction parallel to the plane that is transverse to the rotation axis, each of said connecting surface segments being a reflective surface and spacing apart a corresponding adjacent pair of said light-exit parts in the first direction by a second height and in the second direction by a width.

16. The optical projecting system as claimed in claim 15, wherein the second height between each adjacent pair of said light-exit parts in the first direction is equal to twice the predefined first height of each of the colored light beam components, and the width between each adjacent pair of said light-exit parts in the second direction is equal to twice the predefined first height of the colored light beam components multiplied by tangent of the angle.

17. The optical projecting system as claimed in claim 16, wherein each of said light-filtering plates has a thickness along the rotation axis, and equal in magnitude to the predefined first height of each of the colored light beam components multiplied by sine of the angle.

18. The optical projecting system as claimed in claim 13, wherein said light source provides the composite source light in the first direction to said light-incident side.

19. The optical projecting system as claimed in claim 14, wherein the angle is 45 degrees.

20. The optical projecting system as claimed in claim 2, wherein said reflective color wheel further includes a multi-layer composite light reflector between an adjacent pair of said multi-layer light-reflecting sections for reflecting the composite light beam components toward said light-modulating unit without splitting the composite light beam components into the colored light beam components,
wherein each of said light-filtering plates further includes a composite-light-reflecting segment, and
wherein said composite-light-reflecting segments of said light-filtering plates are staggered relative to each other along the rotation axis and constitute said multi-layer composite light reflector of said reflective color wheel.

* * * * *